(12) United States Patent
Cardillo, Jr. et al.

(10) Patent No.: US 10,918,973 B2
(45) Date of Patent: Feb. 16, 2021

(54) DEVICE FOR MEDIUM SEPARATION

(71) Applicant: Hydac Technology Corporation, Bethlehem, PA (US)

(72) Inventors: James Jay Cardillo, Jr., Allentown, PA (US); Joe Quirk, Bethlehem, PA (US); Nicholas Daniel Gregory, Bethlehem, PA (US); Ryan Matthews Frederick, Hamburg, PA (US); William Michael Sassano, Easton, PA (US); Brian A. Schreiber, Slatingtom, PA (US)

(73) Assignee: HYDAC TECHNOLOGY CORPORATION, Bethlehem, PA (US)

( * ) Notice: Subject to any disclaimer, the term of this patent is extended or adjusted under 35 U.S.C. 154(b) by 145 days.

(21) Appl. No.: 15/801,403

(22) Filed: Nov. 2, 2017

(65) Prior Publication Data
US 2019/0126172 A1  May 2, 2019

(51) Int. Cl.
| | |
|---|---|
| *B01D 19/00* | (2006.01) |
| *B01D 36/00* | (2006.01) |
| *B01D 21/26* | (2006.01) |
| *B04C 9/00* | (2006.01) |
| *F15B 21/044* | (2019.01) |
| *F15B 21/041* | (2019.01) |

(52) U.S. Cl.
CPC ..... *B01D 19/0057* (2013.01); *B01D 19/0031* (2013.01); *B01D 21/267* (2013.01); *B01D 36/001* (2013.01); *B01D 2201/291* (2013.01); *B04C 2009/008* (2013.01); *F15B 21/041* (2013.01); *F15B 21/044* (2013.01)

(58) Field of Classification Search
CPC .............. B01D 19/0057; B01D 21/267; B01D 36/001; B01D 2201/291; B01D 19/00–0495; B04C 2009/008
USPC ................................ 96/155–220; 95/241–266
See application file for complete search history.

(56) References Cited

U.S. PATENT DOCUMENTS

| | | | | |
|---|---|---|---|---|
| 4,596,586 A | * | 6/1986 | Davies ............... | B01D 19/0057 95/261 |
| 4,865,632 A | * | 9/1989 | Yano .................. | B01D 19/0057 96/212 |
| 4,878,924 A | * | 11/1989 | Yano .................. | B01D 19/0057 96/212 |
| 5,961,700 A | * | 10/1999 | Oliver ................. | A61M 1/3627 210/188 |
| 6,143,106 A | * | 11/2000 | Shane .................... | B01D 29/21 156/69 |
| 2003/0222006 A1 | * | 12/2003 | Cella ...................... | B01D 29/23 210/188 |

(Continued)

*Primary Examiner* — T. Bennett McKenzie
(74) *Attorney, Agent, or Firm* — Wenderoth, Lind & Ponack, L.L.P.

(57) ABSTRACT

A device for medium separation, in particular for separation of gases, such as air, from a fluid, such as oil, has a separating device (22) accommodated in a housing (1). When the medium is received via an inlet point (24) of the housing (1), this medium is rotated for the separation. The housing (1) has at least one outlet point (26) for gas and at least one outlet point (16) for fluid, which outlet points are separated from one another. A filter device (40) is in the housing for the separation of particulate contamination and is arranged after the separating device (22) in the direction of flow of the fluid.

14 Claims, 2 Drawing Sheets

(56) References Cited

U.S. PATENT DOCUMENTS

| | | | |
|---|---|---|---|
| 2006/0096933 A1* | 5/2006 | Maier | B01D 45/14 |
| | | | 210/787 |
| 2006/0102548 A1* | 5/2006 | Attassery | B01D 27/08 |
| | | | 210/433.1 |
| 2014/0251140 A1* | 9/2014 | Sams | B04C 5/04 |
| | | | 95/261 |
| 2014/0326655 A1* | 11/2014 | Marvin | B01D 19/0057 |
| | | | 210/436 |
| 2015/0041380 A1* | 2/2015 | Lin | B01D 19/0031 |
| | | | 210/188 |

* cited by examiner

DEVICE FOR MEDIUM SEPARATION

FIELD OF THE INVENTION

The invention relates to a device for medium separation, in particular for separation of gases, such as air, from a fluid or liquid, such as oil, by a separating device, which is accommodated in a housing and which, when the medium is received via an inlet point of the housing, sets this medium in rotation for the purpose of realizing the separation. The housing has at least one outlet point for gas and at least one outlet point for fluid. The outlet points are separated from one another. A filter device is arranged in the housing for the separation of particulate contamination.

BACKGROUND OF THE INVENTION

Such separating devices advantageously permit releasing media, such as fluids, which have a high foam content, for example in the form of foaming hydraulic oil, from the gas content in the form of air. These devices have applications in particular in hydraulic circuits, in which high quantities of air make it into the fluid circuit, as frequently occurs in the case of transmission components of wind turbines for example. Due to the separation of particulate contamination, which is realized in addition to the air separation, the use of such devices in hydraulic circuits not only has an impact on the damaging effects of cavitation, but also reduces the risk of operational interruptions due to wear.

Document DE 10 2008 029 203 A1 discloses a device of the type mentioned above, in which the separating device for the separation of air from hydraulic oil comprises a centrifugal separator in the form of a cyclone. In the known device, the filter device is formed by a filter element that, with its filter mat extending between the end caps, extends over a central part of the housing in a continuous manner from a housing base part to a housing head part. The medium inlet point, which is located at the base part, is connected to the outer side of the hollow cylindrical filter mat. In the inner filter cavity of the filter mat, the separating device in the form of a cyclone separator is arranged for the separation of air from oil. The centrifugal separator has a tubular body, which extends coaxially in the filter cavity surrounded by the filter mat and which has an end part with an expanded internal diameter. The end part forms the swirl chamber of the cyclone separator. In the wall of the swirl chamber, inflow slits are formed extending tangential to the interior, by which the medium to be degassed flows in from the filter cavity forming the filtrate side in such a way that a swirl flow is created in the swirl chamber. From the end of the tubular body opposite the swirl chamber, the degassed fluid discharges via the end cap of the filter element facing the base part and leaves the housing via an outlet point formed on the base part. From the swirl chamber located at the other end of the tubular body, the gas separated by the cyclone leaves the housing via an outlet point located on the head part.

SUMMARY OF THE INVENTION

On the basis of this prior art, the problem addressed by the invention is to provide an improved device of the above-mentioned type, which can be operated in a particularly economical manner and which is distinguished from the known solution by greater separation efficiency.

This problem is basically solved according to the invention by a device having the filter device arranged after the separating device when viewed in the direction of flow of the fluid. The medium rotation in the swirl chamber can be generated by a direct connection between the inlet point of the housing and the swirl chamber. For development of the cyclone with a high rotational speed and a correspondingly strong centrifugal force, the full system pressure of the inlet point is then available, without the pressure drop produced during passage through the filter material of the filter element, so that a high medium separation efficiency can be achieved. Furthermore, by contrast with the above-mentioned known solution, in which the separating device is installed in the filter element, the device according to the invention allows inserting a filter element of simple construction, which has merely of the hollow body of the filter mat extending between the end caps. In the case of operation-related procedures to exchange the filter element, relatively speaking significantly less material costs are therefore incurred, so that the device according to the invention can be operated in a particularly economical manner.

In advantageous exemplary embodiments, the separating device forms a centrifugal separator by guide walls of an at least partially circular cylindrical chamber of the housing and with an eccentric introduction of the medium via the inlet point. The introduction of the medium occurs with a flow direction tangential to the wall of the chamber, so that the chamber forms a swirl chamber for a medium flow in the form of a cyclone.

The arrangement is advantageously such that the filter device has a filter element, which is accommodated in an additional circular cylindrical chamber of the housing.

In advantageous exemplary embodiments, the two chambers are separated inside the housing by a separating wall, which has a passage that establishes the fluid connection between the one chamber of the centrifugal separator and the non-filtrate side of the filter element.

The arrangement can particularly advantageously be such that the filtrate side of the filter element is located in the additional chamber of the housing, which additional chamber has the outlet point for fluid penetrating the housing as an additional passage.

For gas separated from the medium by the centrifugal separator, the one chamber has an outlet point for gas as part of the separating device. The gas outlet point advantageously penetrates a cover part of the housing, which cover part closes a housing pot in the upward direction during operation.

In advantageous exemplary embodiments, the outlet points for gas and fluid and the passage in the separating wall between the separating device and the filter device are in each case arranged extending coaxial to the longitudinal axis of the housing. In the coaxial arrangement, the outlet point for gas is advantageously oriented towards the central region of the gas core, which is formed in the center of the cyclone during operation.

The separating wall with its passage can advantageously form an end cap for the filter element, which can then be removed from the filter pot together with the end cap.

In advantageous exemplary embodiments, the filter pot is formed from two housing parts, of which one housing part comprises the one chamber and other housing part comprises the additional chamber.

In advantageous exemplary embodiments, the outlet point for gas is formed by an outlet nozzle, which is preferably arranged in the cover part. The nozzle cross section expands in the direction of the one chamber in a continuous manner, preferably conically. The choice of the size and form of the nozzle cross section optimizes a suctioning process for the output of the gas core formed in the cyclone.

The inlet point for medium is particularly advantageously also formed by an inlet nozzle, which is preferably arranged in the guide wall of the one chamber. The inlet nozzle cross section tapers in the direction of the one chamber, at least in sections, in a continuous manner, preferably conically, inside the guide wall. The inlet nozzle maximizes the tangential velocity in the swirl chamber with simultaneously low pressure loss.

The arrangement is particularly advantageously such that the one chamber is divided into two chamber regions, of which one circular cylindrical region in the direction of the inlet of the medium is arranged in front of a conical region, which is narrowed in the direction of the outlet of the fluid from this one chamber. This formed contour of the swirl chamber with an internal diameter of the bottom chamber region that is tapered relative to the top chamber region counteracts a decrease in the tangential velocity of the cyclone produced by the increasing distance from the inlet nozzle and then improves the centrifugal force separation in the bottom region of the cyclone.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
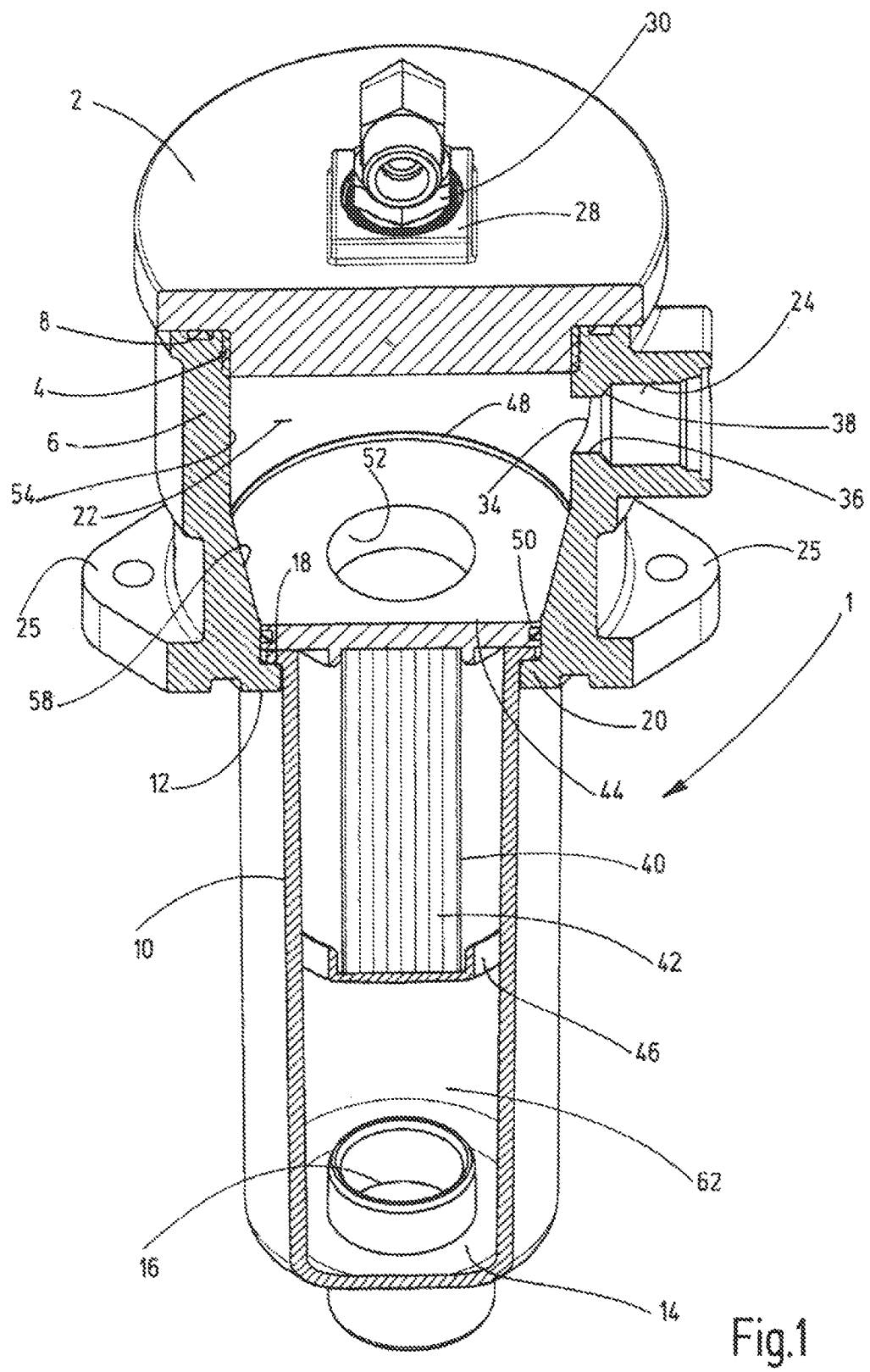
FIG. 1 is a perspective view in section of a device for medium separation according to an exemplary embodiment of the invention, taken along an eccentrically extending vertical plane.

The exemplary embodiment of the device according to the invention that is depicted in the drawings has a housing in the form of a housing filter pot 1 that is closed at the end lying at the top in the drawings by a circular, planar cover part 2. Cover part 2 can be attached by a screw thread 4 in a removable manner at the opening edge of a top housing chamber 6 of the housing pot. A sealing element 8 forms a seal at the top circumferential edge of the chamber 6. The housing pot is completed by a bottom additional chamber 10, which is connected to the open bottom end 12 of the top, first chamber 6. This second chamber 10 has the form of a tubular hollow circular cylinder, which is closed at the bottom end by a planar base 14. A centrally lying passage 16 is located in planar base 14 and forms the outlet point for fluid during operation. At the opposite top open end, the second chamber 10 has a radially projecting annular rib 18, by which the second chamber 10 is held on a shoulder 20 that projects radially inwards and that is located at the bottom end of the first top chamber 6.

Figure 2:
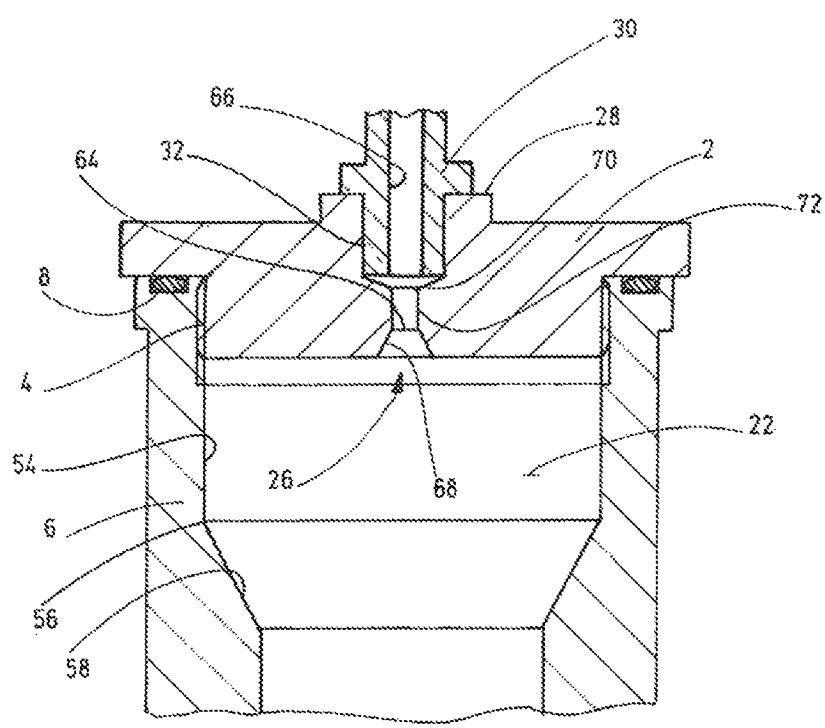
FIG. 2 is a schematically simplified, partial side view in section of only the region of the device of the exemplary embodiment without a filter device.

The top chamber 6 forms on the inside a swirl chamber 22 for the formation of a cyclone that acts as a centrifugal separator from a medium flow, which can flow in via an inlet point 24. The inlet point 24, which is arranged on the wall of the chamber 6 in the vicinity of the cover part 2, is oriented such that the medium flows in tangentially to the inner wall of the chamber 6 and forms a cyclone in the swirl chamber 22. With the rotational position of the housing 1 shown in FIG. 1 and with the eccentrically extending vertical sectional plane, the inlet point 24 is visible in a cut manner. In the schematically simplified partial depiction of FIG. 2 with a twisted position relative to FIG. 1, the inlet point 24 is not visible. In the simplified depiction of FIG. 2, the outer wall of the chamber 6 is also depicted as a smooth outer sheath surface without the radially outwardly projecting flange parts 25 visible in FIG. 1, which flange parts form the attachment points for the device. By contrast, FIG. 2 shows the details of an outlet point 26 for gas, which is located inside the cover part 2 and is therefore not visible in the eccentrically-extending sectional plane of FIG. 1. Of the details associated with the outlet point 26, FIG. 1 shows only an elevation 28 projecting on the top side of the cover part 2, which elevation has the form of a square, and a connection body 30, which is screwed into a threaded hole 32, which is located in the central region of the elevation 28.

The inlet point 24 has an inlet nozzle 36 in the inner guide wall 34 of the chamber 6, which has a conical taper 38 inside the guide wall 34. The choice of the nozzle cross section optimizes the relationship between tangential velocity of the medium flow and pressure loss.

The filter device has a filter element 40 with a filter medium, which extends in the form of a hollow cylindrical, pleated filter mat 42 between the end caps 44 and 46. The end cap 44 lying at the top in FIG. 1 has a circular disk 48, the diameter of which is greater than the diameter of the filter mat 42. In the installed state, which is shown in FIG. 1, the circular disk 48 lies with its bottom side on the annular rib 18 of the second chamber 10. The filter element 40 is held in such a way that it extends into the inside of the second chamber 10, in which the bottom end cap 46 is located at a distance from the base 14 and forms a closed end of said filter as shown in FIG. 1. In this position, the circular disk 48 with its external circumference is sealed by a sealing element 50 at the inner wall of the top chamber 6. The circular disk 48 then forms a separating wall, which closes the top chamber 6 in the downwards direction save for a central passage 52, which forms the fluid connection between the top chamber 6 and the inner filter cavity of the filter element 40, which inner cavity forms the non-filtrate side of the filter element 40 during operation.

As the Figures show, the top, first chamber 6 is divided into two chamber regions, which together form the swirl chamber 22. The top chamber region has the form of a circular cylinder 54, to which an inner cone 58 is connected at a transition point 56, which inner cone forms the bottom chamber region and which narrows in the downwards direction. During operation, the medium flow flowing in via the inlet nozzle 36 tangential to the guide wall 34, which contains a gas content, such as air, generates a cyclone in the swirl chamber 22. In the center of swirl chamber 22, an air core separated from the fluid is formed, which air core is surrounded by the degassed fluid. The gas outlet point 26 in the cover part 2 is oriented towards the air core and permits the output of the separated air via the connection body 30. The degassed fluid flows via the passage 52 in the circular disk 48, which forms the separating wall of the top chamber 6, and into the inner filter cavity of the filter element 40 forming the non-filtrate side. After passing through the filter mat 42, the degreased fluid reaches the filtrate side 62 in the second chamber 10, from which the filtrate or filtered fluid discharges via the passage 16. As can be seen in FIG. 2 only, the outlet point 26 has an outlet nozzle 64, which forms the passage to the inner channel 66 of the connection body 30. The outlet nozzle 64 has a cone 68 at the entry region adjoining the swirl chamber 22, a second cone 70 at the exit region adjoining the channel 66 of the connection body 30 and additionally has a circular cylindrical intermediate part 72 extending between the cones 68 and 70. The first cone 68 expands in the direction of the swirl chamber 22, while the second cone 70 expands in the direction of the channel 66 of the connection body 30. The nozzle cross section of the outlet nozzle 64 and the form of the cones 68, 70, in particular of the cone 68 adjoining the swirl chamber 22, can be designed such that the air core can be suctioned off via the connection body 30 during operation, before the separated air moves with the fluid in the direction of the filter element 40. The division of the swirl chamber 22 in the chamber 6 into two chamber regions with a bottom inner cone 58 connected to the top circular cylinder 54 counteracts a tendency of the tangential velocity of the cyclone to decrease with increasing axial distance from the inlet nozzle 36 to enhance the separation efficiency in the bottom region of the swirl chamber 22.

While one embodiment has been chosen to illustrate the invention, it will be understood by those skilled in the art that various changes and modifications can be made therein without departing from the scope of the invention as defined in the claims.

The invention claimed is:

1. A separating device for separating gas from a liquid, the separating device comprising:
a housing having a filter pot and having an inlet point capable of conveying a liquid with gas and particulate impurities therein into said housing, said inlet point being capable of causing said liquid to rotate in said housing so as to separate the gas from the liquid in a separator in said housing, said separator being a centrifugal separator having guide walls forming a first chamber of said housing with said inlet point being capable of eccentrically delivering the liquid into a circular cylindrical region of said first chamber, a frustoconical region of said first chamber being downstream of said circular cylindrical region;
a gas outlet point capable of releasing the gas from said housing after separation from the liquid;
a fluid outlet point capable of releasing liquid from said separator after separation of the gas, said gas outlet point and said fluid outlet point being separate from one another, said frustoconical region narrowing in a direction of and ending at said fluid outlet point; and
a filter in said housing capable of separating particulate contamination from the liquid and having an interior unfiltrate cavity, said filter being downstream of said separator in a direction of liquid flow through said housing, said filter having a filter medium and an end cap on said filter medium, said end cap forming a separation wall being between said separator and said filter medium and having a passage therein forming said fluid outlet point, said passage providing direct fluid communication between said separator and said interior unfiltrate cavity without fluid passing through said filter medium, said filter medium and said end cap being removable from said filter pot with said end cap.

2. A separating device according to claim 1 wherein said filter is accommodated in a second circular cylindrical chamber in said filter pot.
3. A separating device according to claim 2 wherein said first chamber and said second circular cylindrical chamber are separated inside said housing by said separation wall, said passage providing fluid communication between said first circular cylindrical chamber and a non-filtrate side of said filter.
4. A separating device according to claim 3 wherein said filter comprises a filtrate side located in said second circular cylindrical chamber in said housing, said housing having an outlet passage penetrating said housing in fluid communication with said second circular cylindrical chamber capable of discharging filtered fluid from said second circular cylindrical chamber.
5. A separating device according to claim 1 wherein said gas outlet point is in said first chamber.
6. A separating device according to claim 5 wherein said housing comprises a cover part closing said filter pot in an upward direction during operation, said gas outlet point penetrating said cover part.
7. A separating device according to claim 4 wherein said gas outlet point, said fluid outlet point and said outlet passage are coaxial along a longitudinal axis of said housing.
8. A separating device according to claim 2 wherein said housing comprises first and second housing parts with said first housing part having said first chamber therein and with said second housing part having said second circular cylindrical chamber therein.
9. A separating device according to claim 1 wherein said gas outlet point comprises an outlet nozzle with an outlet cross section expanding continuously in a direction of said first chamber.
10. A separating device according to claim 9 wherein said outlet cross section is conical.
11. A separating device according to claim 1 wherein said inlet point comprises an inlet nozzle with a nozzle cross section tapering in a direction of said first chamber, said inlet nozzle being in a guide wall of said first circular cylindrical chamber.
12. A separating device according to claim 11 wherein said nozzle cross section is tapered inside said guide wall.
13. A separating device according to claim 1 wherein said gas outlet point opens into an air core inside said first chamber, said air core being surrounded on an inlet side thereof by the fluid in a tangential flow.
14. A separating device according to claim 2 wherein said housing comprises first and second housing parts with said first housing part having said first chamber therein and with said second housing part having said second circular cylindrical chamber therein;
said gas outlet point comprises an outlet nozzle with an outlet cross section expanding continuously in a direction of said first chamber; and
said inlet point comprises an inlet nozzle with a nozzle cross section tapering in a direction of said circular cylindrical region, said inlet nozzle being in a guide wall of said circular cylindrical region.

* * * * *